US011774284B1

(12) United States Patent
Wu et al.

(10) Patent No.: US 11,774,284 B1
(45) Date of Patent: Oct. 3, 2023

(54) HIGH-SENSITIVITY LIGHT SENSOR AND SENSING METHOD THEREOF COMPRISING A PLURALITY OF COMPARATOR CIRCUITS, RESET CIRCUITS AND COUNTER CIRCUITS

(71) Applicant: EMINENT ELECTRONIC TECHNOLOGY CORP. LTD., Hsin-Chu (TW)

(72) Inventors: Kao-Pin Wu, New Taipei (TW); Yuh-Yuan Wang, Hsinchu (TW)

(73) Assignee: EMINENT ELECTRONIC TECHNOLOGY CORP. LTD., Hsin-Chu (TW)

(*) Notice: Subject to any disclaimer, the term of this patent is extended or adjusted under 35 U.S.C. 154(b) by 0 days.

(21) Appl. No.: 18/295,463

(22) Filed: Apr. 4, 2023

Related U.S. Application Data

(60) Provisional application No. 63/329,489, filed on Apr. 11, 2022.

(30) Foreign Application Priority Data

Jan. 17, 2023 (TW) .................................. 112102108

(51) Int. Cl.
*G01J 1/42* (2006.01)
*G01J 1/46* (2006.01)
*G01J 1/44* (2006.01)

(52) U.S. Cl.
CPC ............... *G01J 1/46* (2013.01); *G01J 1/4204* (2013.01); *G01J 2001/446* (2013.01)

(58) Field of Classification Search
CPC ..................................... G01J 1/42; G01J 1/44
USPC .......................................... 250/214 AL, 214 R
See application file for complete search history.

(56) References Cited

U.S. PATENT DOCUMENTS 8,901,825 B2* 12/2014 Reed ...................... H05B 47/11
315/149

* cited by examiner

*Primary Examiner* — Que Tan Le
(74) *Attorney, Agent, or Firm* — MUNCY, GEISSLER, OLDS & LOWE, P.C.

(57) ABSTRACT

A high-sensitivity light sensor includes a light sensing element, a first integrator, a comparator, and a second integrator. The light sensing element senses a light during a measurement time interval to generate a current. The first integrator integrates the current to generate a first integration signal. The comparator compares the first integration signal with a threshold value. While the first integration signal is greater than the threshold value, the comparison signal is at a first level. The second integrator is coupled to the first integrator and integrates the first integration signal to generate a second integration signal. The light sensor of the present invention uses two integrators to integrate the sensed voltage twice. Therefore, the light sensor of the present invention has a higher sensitivity.

21 Claims, 4 Drawing Sheets

HIGH-SENSITIVITY LIGHT SENSOR AND SENSING METHOD THEREOF COMPRISING A PLURALITY OF COMPARATOR CIRCUITS, RESET CIRCUITS AND COUNTER CIRCUITS

This application claims priority for the U.S. provisional patent application No. 63/329,489 filed on 11 Apr. 2022, and TW patent application no. 112102108 filed on 17 Jan. 2023, the content of which is incorporated by reference in its entirely.

BACKGROUND OF THE INVENTION

Field of the Invention

The present invention relates to a light sensor, particularly to a light sensor for sensing ambient light and a sensing method thereof.

Description of the Prior Art

A light sensor may be used to sense ambient light for determining the intensity of ambient light. The conventional ambient light sensor uses a photodiode to sense ambient light to generate a current. An analog-to-digital converter is used to convert the current into a digital value for determining the light intensity. However, an error may exist between the ambient light intensity outputted by the conventional ambient light sensor and the real ambient light intensity. Recently, many electronic devices have required higher and higher sensitivity of light sensors. The conventional ambient light sensors have been unable to meet requirement. Therefore, it is desired a high-sensitivity light sensor.

SUMMARY OF THE INVENTION

One objective of the present invention is to provide a high-sensitivity light sensor and a sensing method thereof.

In one embodiment of the present invention, the high-sensitivity light sensor comprises a light sensing element, a first integrator, a first comparator, a first reset circuit, a first counter, a second integrator, a second comparator, a second reset circuit, and a second counter. The light sensing element is configured to sense a light during a measurement time interval to generate a first current. The first integrator is coupled to the light sensing element and is configured to integrate the first current to generate a first integration signal. The first comparator is coupled to the first integrator and is configured to compare the first integration signal with a threshold value to generate a first comparison signal. While the first integration signal is larger than the threshold value, the first comparison signal is at a first level. The first reset circuit is coupled to the first integrator and the first comparator and is configured to reset the first integration signal while the first comparison signal is at the first level. The first counter is coupled to the first comparator and is configured to count a number that the first comparison signal is at the first level to generate a first sensing value. The second integrator is coupled to the first integrator and is configured to integrate the first integration signal to generate a second integration signal. The second comparator is coupled to the second integrator and is configured to compare the second integration signal with the threshold value to generate a second comparison signal. While the second integration signal is larger than the threshold value, the second comparison signal is at a second level. The second reset circuit is coupled to the second integrator and the second comparator and is configured to reset the second integration signal while the second comparison signal is at the second level. The second counter is coupled to the second comparator and is configured to count the number that the second comparison signal is at the second level to generate a second sensing value. While the first comparison signal is at the first level, the second counter is reset. While the measurement time interval ends, the first sensing value and the second sensing value are used to determine an intensity of the light.

In one embodiment of the present invention, the high-sensitivity light sensor comprises a light sensing element, a first integrator, a first comparator, a timer, a first reset circuit, a second integrator, a second comparator, a second reset circuit, and a counter. The light sensing element is configured to sense a light during a measurement time interval to generate a first current. The first integrator is coupled to the light sensing element and is configured to integrate the first current to generate a first integration signal. The first comparator is coupled to the first integrator and is configured to compare the first integration signal with a threshold value to generate a first comparison signal. While the first integration signal is larger than the threshold value, the first comparison signal is at a first level. The timer is coupled to the first comparator and is used to measure a first time length between adjacent first levels of first comparison signal while the measurement time interval starts. The timer is also used to measures a second time length between a last first level of the first comparison signal and an end of the measurement time interval. The first reset circuit is coupled to the first integrator and the first comparator and is configured to reset the first integration signal while the first comparison signal is at the first level. The second integrator is coupled to the first integrator and is configured to integrates the first integration signal to generate a second integration signal. The second comparator is coupled to the second integrator and is configured to compare the second integration signal with the threshold value to generate a second comparison signal. While the second integration signal is larger than the threshold value, the second comparison signal is at a second level. The second reset circuit is coupled to the second integrator and the second comparator and is configured to reset the second integration signal while the second comparison signal is at the second level. The counter is coupled to the second comparator and is configured to count the number that the second comparison signal is at the second levels to generate a sensing value. While the first comparison signal is at the first level, the light sensor stores the sensing value and resets the counter. While the measurement time interval ends, all stored sensing values and a present sensing value are used to determine the intensity of the light.

In one embodiment of the present invention, a sensing method of a high-sensitivity light sensor comprises the steps of: using a light sensing element to sense a light during a measurement time interval to generate a first current; integrating the first current to generate a first integration signal; converting the first integration signal into a first sensing value; integrating the first integration signal to generate a second integration signal; generating a second sensing value according to the second integration signal; and determining an intensity of the light according to the first sensing value and the second sensing value.

In one embodiment of the present invention, a sensing method of a high-sensitivity light sensor comprises the steps of: using a light sensing element to sense a light during a measurement time interval to generate a first current; integrating the first current to generate a first integration signal; integrating the first integration signal to generate a second integration signal; generating a sensing value according to the second integration signal; and determining an intensity of the light according to the sensing value.

The light sensor of the present invention and the sensing method thereof can achieve more accurate measurement results and thus have higher sensitivity.

DETAILED DESCRIPTION OF THE INVENTION

Figure 1:
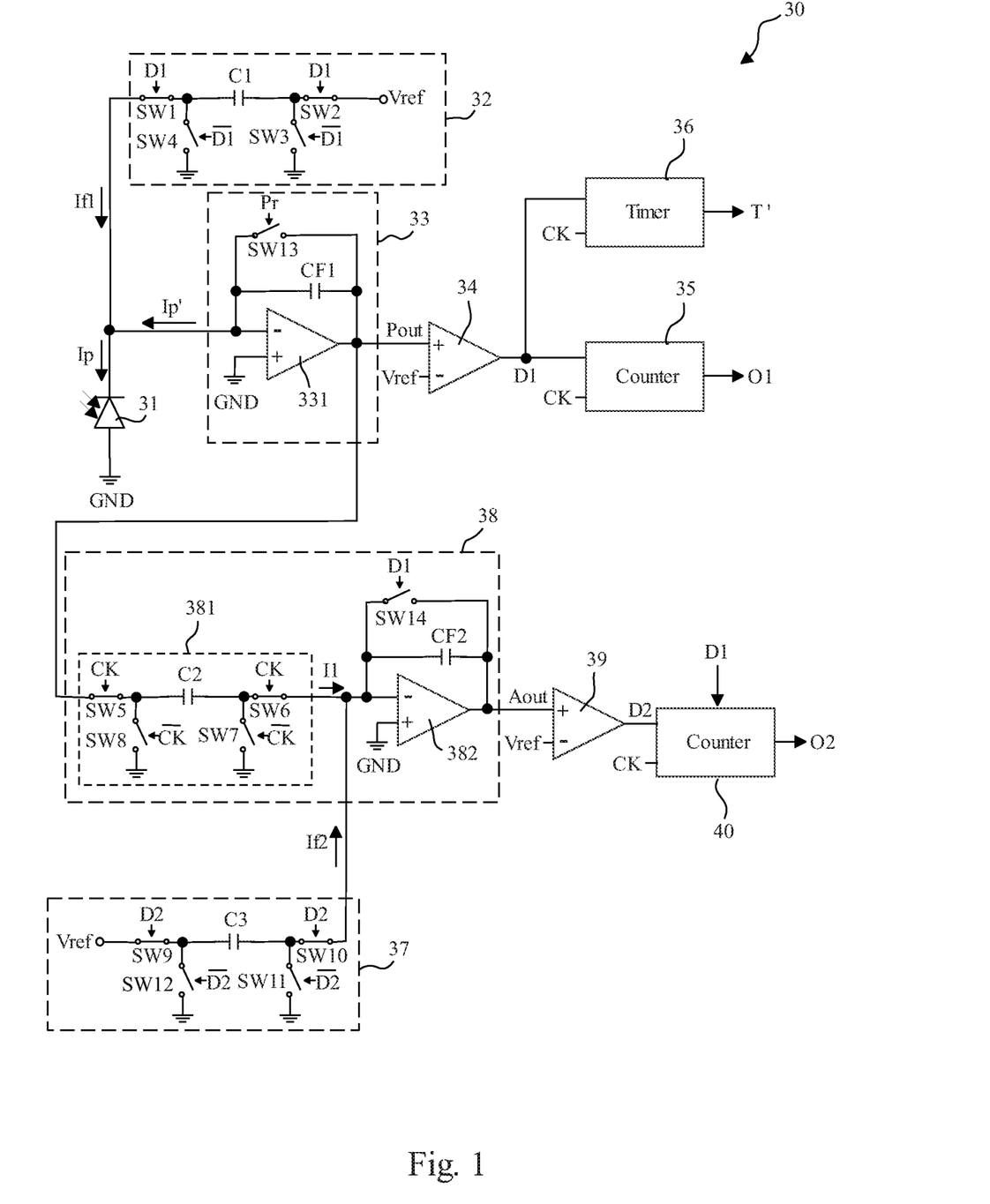
FIG. 1 is a diagram schematically showing a high-sensitivity light sensor according to a first embodiment of the present invention.
Figure 2:
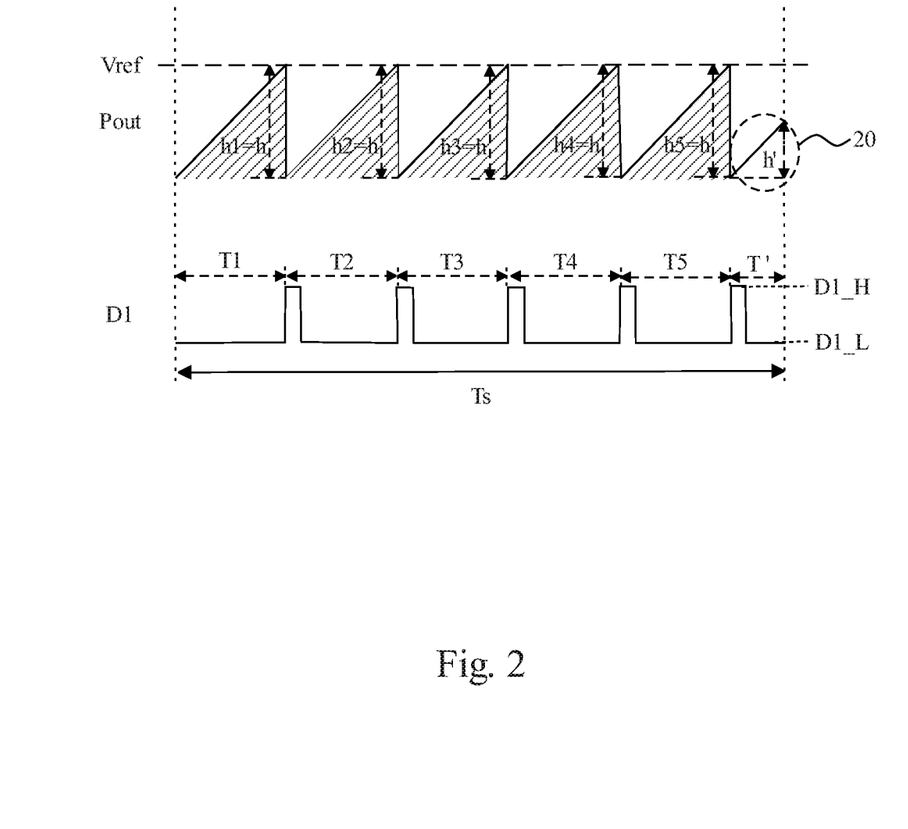
FIG. 2 is a diagram showing waveforms of an integration signal Pout and a comparison signal D1 during a measurement time interval in FIG. 1.

FIG. 1 is a diagram schematically showing a high-sensitivity light sensor according to a first embodiment of the present invention. FIG. 2 is a diagram showing waveforms of an integration signal Pout and a comparison signal D1 during a measurement time interval Ts in FIG. 1. The light sensor 30 shown in FIG. 1 comprises a light sensing element (such as a photodiode 31), a reset circuit 32, an integrator 33, a comparator 34, a counter 35, a timer 36, a reset circuit 37, an integrator 38, a comparator 39, and a counter 40. The photodiode 31 is used to sense an ambient light or a light to generate a current Ip. The integrator 33 integrates the current Ip' to generate an integration signal Pout. In the case that a switch SW1 of the reset circuit 32 is turned off, Ip'=Ip. The integrator 33 includes an operational amplifier 331, a switch SW13, and a capacitor CF1. An inverting input terminal of the operational amplifier 331 is connected to the photodiode 31. A non-inverting input terminal of the operational amplifier 331 is connected to a ground terminal GND. The output terminal of the operational amplifier 331 is connected to a non-inverting input terminal of the comparator 34. The capacitor CF1 is coupled between the inverting input terminal and output terminal of the operational amplifier 331. The switch SW13 is connected in parallel with the capacitor CF1 and controlled by a signal Pr. In one embodiment, a circuit control unit (not shown in the drawings) provides the signal Pr. During the measurement time interval Ts, the signal Pr may control the switch SW13 to turn off. While the signal Pr controls the switch SW13 to turn on, the integrator 33 is reset, whereby the integration signal Pout is reset to an initial value, and the integrator 33 stops integrating the current Ip'. While the signal Pr controls the switch SW13 to turn off, the integrator 33 leaves the reset state and starts integrating the current Ip', whereby the value of the integration signal Pout rises. The comparator 34 is connected to the integrator 33. The comparator 34 compares the integration signal Pout, which is output by the integrator 33, with a reference voltage Vref, which functions as a threshold value. While the integration signal Pout is larger than the reference voltage Vref, a comparison signal D1, which is output by the comparator 34, is at a high level D1_H (i.e. the first level). However, the present invention is not limited by the embodiment. The reset circuit 32 is connected to the integrator 33 and the comparator 34. While the comparison signal D1 is at the high level D1_H, the reset circuit 32 resets the integration signal Pout to the initial value. The reset circuit 32 includes a voltage source (not shown in the drawing) and a switch-capacitor (switch-C) circuit. In the embodiment, the voltage source provides the reference voltage Vref. The switch-capacitor circuit includes a capacitor C1 and four switches SW1, SW2, SW3, and SW4. The switch SW1 is coupled between a first terminal of the capacitor C1 and the photodiode 31. The switch SW2 is coupled between a second terminal of the capacitor C1 and the reference voltage Vref. The switch SW3 is coupled between the second terminal of the capacitor C1 and the ground terminal GND. The switch SW4 is coupled between the first terminal of the capacitor C1 and the ground terminal GND. The switches SW1 and SW2 are controlled by the comparison signal D1. The switches SW3 and SW4 are controlled by a signal D1, wherein the signal D1 is an inverted signal of the comparison signal D1. As shown in FIG. 2, while the comparison signal D1 is at the high level D1_H, the switches SW1 and SW2 are turned on, and the switches SW3 and SW4 are turned off. Thus, the reset circuit 32 is triggered to generate a reset current $$If1 = \frac{C1 \times Vref}{t1},$$

which resets the integration signal Pout to the initial value, wherein t1 is a time length that the switches SW1 and SW2 are turned on. The counter 35 counts the number that the comparison signals D1 is at the high level during the measurement time interval Ts to generate a sensing value O1.

The combination of the reset circuit 32, the integrator 33, the comparator 34 and the counter 35 may be regarded as an analog-to-digital converter, converting the analog current Ip' into the digital sensing value O1. The timer 36 is connected to the output terminal of the comparator 34. The timer 36 counts a time length Ti between adjacent high levels D1_H of the comparison signals D1 according to a clock signal CK, and also counts a time length T' between the last high level D1_H and the end of the measurement time interval Ts, wherein Ti is the time length between the (i−1)th high level D1_H and the ith high level D1_H of the comparison signals D1. For example, as shown in FIG. 2, the time length T1 is the time length between the $0^{th}$ high level D1_H (i.e. the starting point of the measurement time interval Ts) and the first high level D1_H of the comparison signal D1; the time length T2 is the time length between the first high level D1_H and the second high level D1_H of the comparison signal D1. In the embodiment shown in FIG. 1, the timer 36 outputs the time length T' while the measurement time interval Ts ends.

As shown in FIG. 1, the integrator 38 is connected to the output terminal of the operational amplifier 331 of the integrator 33 and used to integrate the integration signal Pout to generate an integration signal Aout. The integrator 38 includes an impedance circuit 381, an operational amplifier 382, a switch SW14, and a capacitor CF2. The impedance circuit 381 is coupled between the integrator 33 and the inverting input terminal of the operational amplifier 382 and is used to converting the integration signal Pout into a current signal I1. The impedance circuit 381 includes a capacitor C2 and four switches SW5, SW6, SW7, and SW8.

The switch SW5 is coupled between a first terminal of the capacitor C2 and the integrator 33. The switch SW6 is coupled between a second terminal of the capacitor C2 and the inverting input terminal of the operational amplifier 382. The switch SW7 is coupled between the second terminal of the capacitor C2 and the ground terminal GND. The switch SW8 is coupled between the first terminal of the capacitor C2 and the ground terminal GND. The switches SW5 and SW6 are controlled by the clock signal CK. The switches SW7 and SW8 are controlled by a clock signal $\overline{CK}$ which is an inverted signal of the clock signal CK. While the switches SW5 and SW6 are turned off and the switches SW7 and SW8 are turned on, the charges of the capacitor C2 are discharged to the ground terminal GND. While the switches SW5 and SW6 are turned on and the switches SW7 and SW8 are turned off, the capacitor C2 generates a current signal $$I1 = \frac{C2 \times Pout}{t2},$$

wherein t2 is a time length that the switches SW5 and SW6 are turned on. The impedance circuit 381 has an equivalent resistance $$R = \frac{t2}{C2}.$$

In FIG. 1, the impedance circuit 381 is, but not limited by, a switch-capacitor circuit. A non-inverting input terminal of the operational amplifier 382 is connected to the ground terminal GND; the output terminal of the operational amplifier 382 is connected to the non-inverting input terminal of the comparator 39. The capacitor CF2 is coupled between the inverting input terminal and output terminal of the operational amplifier 382. The switch SW14 is connected in parallel with the capacitor CF2 and controlled by the comparison signal D1. While the comparison signal D1 is at the high level D1_H, the switch SW14 is turned on, and the integrator 38 enters the reset state. Thus, the integration signal Aout is reset to an initial value, and the integrator 38 stops integrating the integration signal Pout. While the comparison signal D1 is at a low level D1_L, the switch SW14 is turned off, the integrator 38 leaves the reset state and starts integrating the integration signal Pout, whereby the value of the integration signal Aout rises.

In FIG. 1, the comparator 39 is connected to the integrator 38. The comparator 39 compares the integration signal Aout, which is output by the integrator 38, with the reference voltage Vref. While the integration signal Aout is larger than the reference voltage Vref, a comparison signal D2 generated by the comparator 39 is at a high level (i.e. a second level) D2_H (not shown in the drawing). However, the present invention is not limited by the embodiment. The reset circuit 37 is connected to the integrator 38 and the comparator 39. While the comparison signal D2 is at the high level D2_H, the reset circuit 37 resets the integration signal Aout to the initial value. The reset circuit 37 includes a voltage source (not shown in the drawing) and a switch-capacitor circuit. The voltage source may provide the reference voltage Vref. The switch-capacitor circuit includes a capacitor C3 and four switches SW9, SW10, SW11, and SW12. The switch SW9 is coupled between a first terminal of the capacitor C3 and the voltage source. The switch SW10 is coupled between a second terminal of the capacitor C3 and the inverting input terminal of the operational amplifier 382. The switch SW11 is coupled between the second terminal of the capacitor C3 and the ground terminal GND. The switch SW12 is coupled between the first terminal of the capacitor C3 and the ground terminal GND. The switches SW9 and SW10 are controlled by the comparison signal D2. The switches SW11 and SW12 are controlled by a signal $\overline{D2}$, wherein the signal $\overline{D2}$ is an inverted signal of the comparison signal D2. While the comparison signal D2 is at the high level, the switches SW9 and SW10 are turned on, and the switches SW11 and SW12 are turned off. Thus, the reset circuit 37 generates a reset circuit $$If\ 2 = \frac{C3 \times Vref}{t3},$$

to reset the integration signal Aout to the initial value, wherein t3 is a time length that the switches SW9 and SW10 are turned on. The counter 40 is connected to the comparators 34 and 39 and used to count the number that the comparison signal is at the high levels D2_H to generate a sensing value O2. While the comparison signal D1 of the comparator 34 is at the high level D1_H, the counter 40 is reset, whereby to reset the sensing value O2 to zero. The combination of the reset circuit 37, the integrator 38, the comparator 39 and the counter 40 may be regarded as an analog-to-digital converter.

After the measurement time interval Ts ends, the sensing value O1 and the sensation O2 may be used to calculate a sensing value $$O = O1 + h' = O1 + \frac{2 \times O2}{T'},$$

which represents the intensity of the ambient light (or light). The light sensor 30 of the present invention can perform the calculation about the rump area 20. Therefore, the present invention can achieve more accurate sensation results and features higher sensitivity.

According to above description, it can be to understand that the sensing method of the light sensor 30 of the present invention comprises the steps of:

using a light sensing element to sense a light during a measurement time interval to generate a first current;

integrating the first current to generate a first integration signal;

converting the first integration signal into a first sensing value;

integrating the first integration signal to generate a second integration signal;

generating a second sensing value according to the second integration signal; and determining an intensity of the light according to the first sensing value and the second sensing value.

In the sensing method of the light sensor 30 of the present invention, the step of integrating the first integration signal to generate the second integration signal, further includes:

converting the first integration signal into a second current; and integrating the second current to generate the second integration signal.

Figure 3:
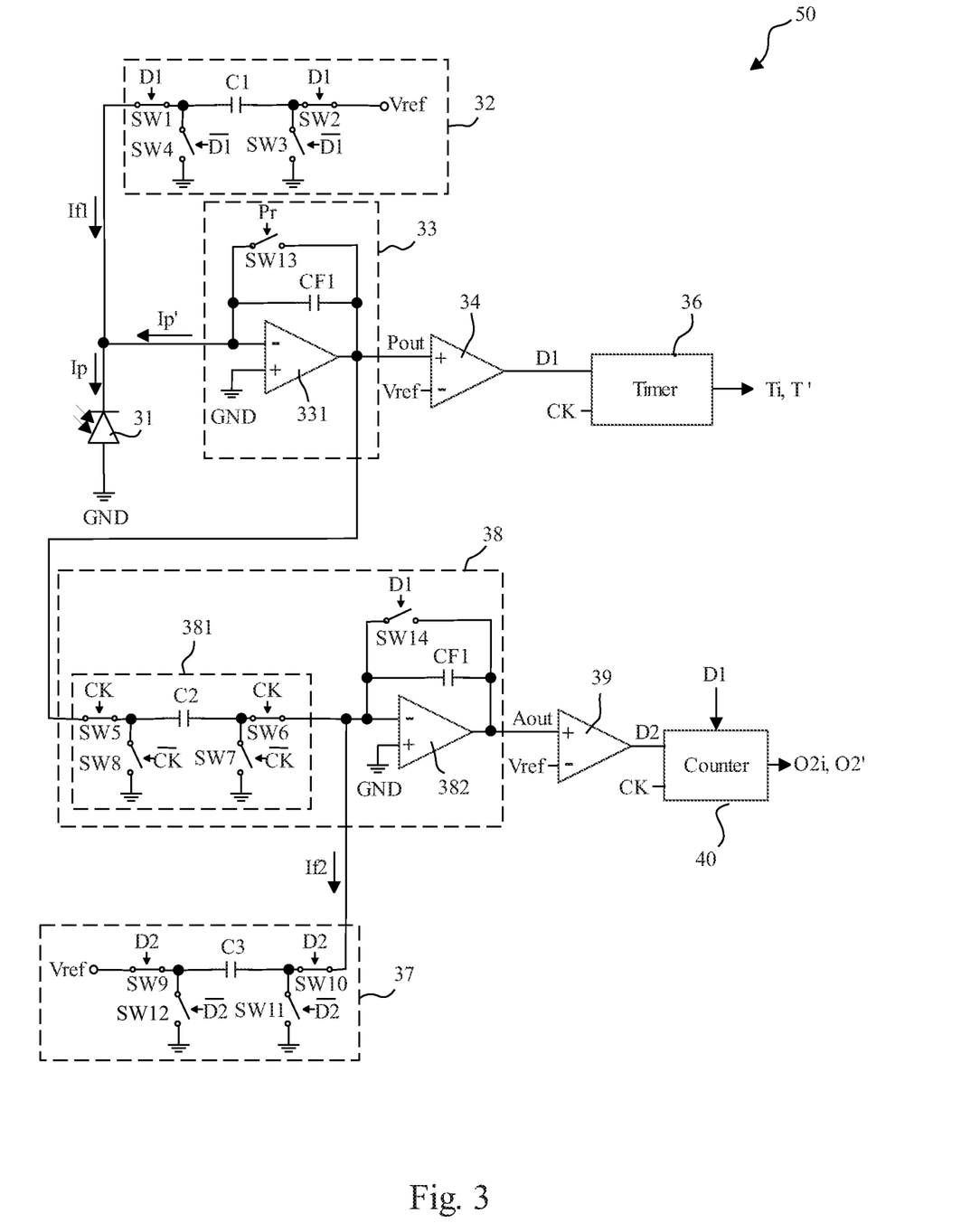
FIG. 3 is a diagram schematically showing a high-sensitivity light sensor according to a second embodiment of the present invention.

FIG. 3 is a diagram schematically showing a high-sensitivity light sensor according to a second embodiment of the present invention. The circuit architecture of the light sensor 50 in FIG. 3 is almost the same as the circuit architecture of the light sensor 30 in FIG. 1 but is different from the circuit architecture of the light sensor 30 in FIG. 1 in that the light sensor 50 in FIG. 3 does not comprise the counter 35. The circuits and/or operations of the photodiode 31, the reset circuit 32, the integrator 33, the comparator 34, the timer 36, the reset circuit 37, the integrator 38, the comparator 39, and the counter 40 may be referred to the description for FIG. 1 and will not repeat herein. The difference between the light sensor 50 of FIG. 3 and the light sensor 30 of FIG. 1 includes: in addition to a time length T' between the last high level D1_H of the comparison signal D1 and the end of the measurement time interval Ts, the counter 36 in FIG. 3 also outputs time lengths Ti between adjacent high levels D1_H of the comparison signal D1, wherein i is an integer larger than 1. Besides, while the comparator 34 output the comparison signal D1, the timer 36 and the counter 40 respectively output the present time length Ti and the present sensing value O2i to a storage device (not shown in the drawing), whereby to store the present time length Ti and the present sensing value O2i. The storage device may be a register or a memory. The sensing value O2i is the sensing value obtained in the ith time length Ti. For example, as shown in FIG. 2, the sensing value obtained in the first time length T1 is a sensing value O21; the sensing value obtained in the fifth time length T5 is a sensing value O25. After the present time length Ti and the present sensing value O2i have been stored, the time length Ti of the timer 36 and the sensing value O2i of the counter 40 are reset for recounting. After the measurement time interval Ts ends, the timer 36 outputs a time length T', which is between the last high level D1_H of the comparison signal D1 and the end of the measurement time interval Ts, to the storage device, and the counter 40 outputs the present sensing value O2' to the storage device. According to the stored sensing values O2i, the stored sensing value O2', the stored time length Ti, and the stored time length T', the sensing value of the ambient light (or light) can be calculated with the formula $$O = \frac{2 \times O2'}{T'} + \sum_{i=1}^{n} \frac{2 \times O2i}{Ti}.$$

For example, in the embodiment shown in FIG. 2 where n=5, the sensing value $$O = \frac{2 \times O21}{T1} + \frac{2 \times O22}{T2} + \frac{2 \times O23}{T3} + \frac{2 \times O24}{T4} + \frac{2 \times O25}{T5} + \frac{2 \times O2'}{T'}.$$

The light sensor 50 of the present invention can perform the calculation about the rump area 20. Therefore, the present invention can achieve more accurate sensation results and has higher sensitivity.

According to the above description, it can be to understand that the sensing method of the light sensor 50 of the present invention comprises the steps of:
  using a light sensing element to sense a light during a measurement time interval to generate a first current;
  integrating the first current to generate a first integration signal;
  integrating the first integration signal to generate a second integration signal;
  generating a sensing value according to the second integration signal; and
  determining an intensity of the light according to the sensing value.

Figure 4:
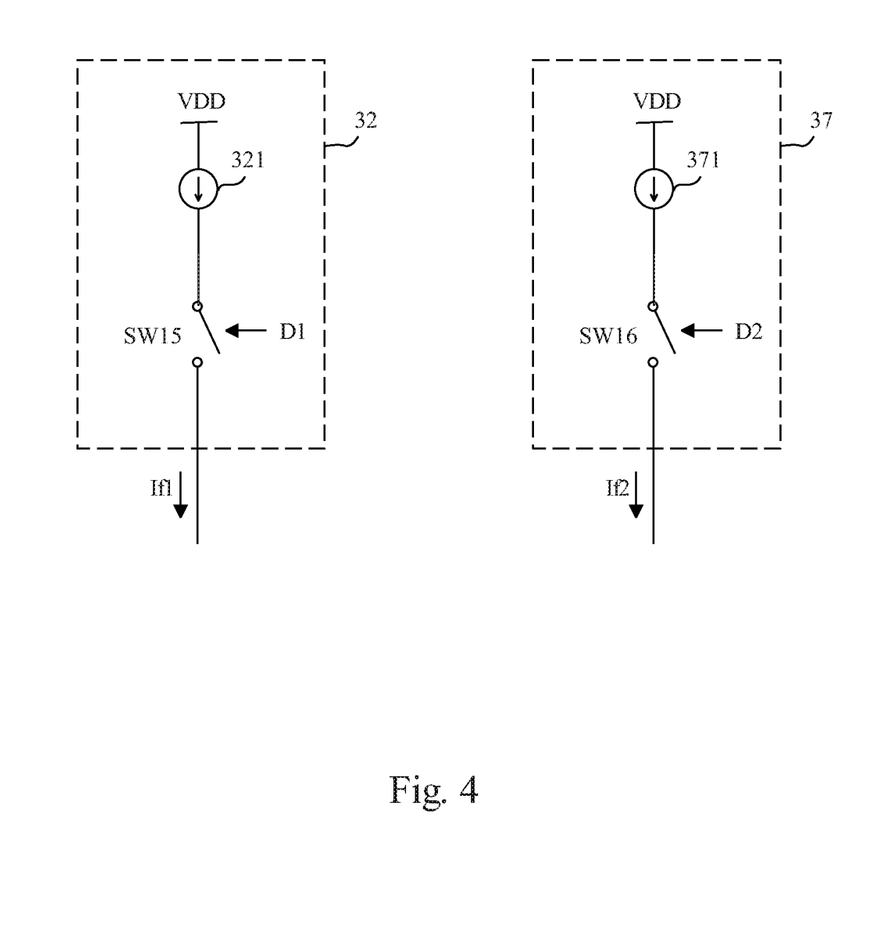
FIG. 4 is a diagram schematically showing other embodiments of the reset circuits in FIG. 1 and FIG. 3.

In the embodiments shown in FIG. 1 and FIG. 3, the reset circuits 32 and 37 are realized with the switch-capacitor circuits. However, the present invention is not limited by these embodiments. FIG. 4 is a diagram schematically showing other embodiments of the reset circuits 32 and 37 in FIG. 1 and FIG. 3. In FIG. 4, the reset circuit 32 includes a current source 321 and a reset switch SW15. The switch SW15 is coupled between the current source 321 and the integrator 33. In details, the reset switch SW15 is coupled between the current source 321 and the inverting input terminal of the operational amplifier 331 of the integrator 33. The reset switch SW15 is controlled by the comparison signal D1. While the comparison signal D1 is at the high level D1_H, the reset switch SW15 is turned on, such that the current source 321 provide a reset current If1 to reset the integration signal Pout. In FIG. 4, the reset circuit 37 includes a current source 371 and a reset switch SW16. The switch SW16 is coupled between the current source 371 and the integrator 38. In details, the reset switch SW16 is coupled between the current source 371 and the inverting input terminal of the operational amplifier 382 of the integrator 38. The reset switch SW16 is controlled by the comparison signal D2. While the comparison signal D2 is at the high level D2_H, the reset switch SW16 is turned on, such that the current source 371 provide a reset current If2 to reset the integration signal Aout.

The embodiments described above are only to exemplify the present invention but not to limit the scope of the present invention. Any person having ordinary knowledge in the art should be able to make equivalent modifications or variations according to the technical contents disclosed above without departing from the scope of the present invention. Therefore, any equivalent modification or variation according to the spirit of the present invention is to be also included by the scope of the present invention.

What is claimed is:

1. A high-sensitivity light sensor, comprising:
  a light sensing element, configured to sense a light during a measurement time interval to generate a first current;
  a first integrator, coupled to the light sensing element, configured to integrate the first current to generate a first integration signal;
  a first comparator, coupled to the first integrator, configured to compare the first integration signal with a threshold value to generate a first comparison signal, wherein while the first integration signal is larger than the threshold value, the first comparison signal is at a first level;
  a first reset circuit, coupled to the first integrator and the first comparator, configured to reset the first integration signal while the first comparison signal is at the first level;
  a first counter, coupled to the first comparator, configured to count a number that the first comparison signal is at the first level to generate a first sensing value;
  a second integrator, coupled to the first integrator, configured to integrate the first integration signal to generate a second integration signal;
  a second comparator, coupled to the second integrator, configured to compare the second integration signal with the threshold value to generate a second comparison signal, wherein while the second integration signal is larger than the threshold value, the second comparison signal is at a second level;

a second reset circuit, coupled to the second integrator and the second comparator, configured to reset the second integration signal while the second comparison signal is at the second level; and a second counter, coupled to the second comparator, configured to count a number that the second comparison signal is at the second level to generate a second sensing value;

wherein while the first comparison signal is at the first level, the second counter is reset;

wherein while the measurement time interval ends, the first sensing value and the second sensing value are used to determine an intensity of the light.

2. The high-sensitivity light sensor according to claim 1, wherein the first integrator comprises:

an operational amplifier, having an inverting input terminal, a non-inverting input terminal, and an output terminal, wherein the inverting input terminal is coupled to the light sensing element, the non-inverting input terminal is coupled to a ground terminal, and the output terminal is coupled to the first comparator;

a capacitor, coupled between the inverting input terminal and the output terminal; and a switch, connected in parallel with the capacitor;

wherein while the measurement time interval starts, the switch is turned off; while the measurement time interval ends, the switch is turned on.

3. The high-sensitivity light sensor according to claim 1, wherein the second integrator comprises:

an operational amplifier, having an inverting input terminal, a non-inverting input terminal, and an output terminal, wherein the non-inverting input terminal is coupled to a ground terminal; the output terminal is coupled to the second comparator;

an impedance circuit, coupled between the inverting input terminal and the first integrator, configured to converting the first integration signal into a current signal;

a capacitor, coupled between the inverting input terminal and the output terminal; and a switch, connected in parallel with the capacitor, turned on while the first comparison signal is at the first level.

4. The high-sensitivity light sensor according to claim 3, wherein the impedance circuit is a switch-capacitor circuit.

5. The high-sensitivity light sensor according to claim 1, further comprising a timer, coupled to the first comparator, configure to measure a time length between a last first level of the first comparison signal and an end of the measurement time interval, wherein the time length, the first sensing value, and the second sensing value are used to determine the intensity of the light.

6. The high-sensitivity light sensor according to claim 5, wherein the intensity of the light is $$O1 + \frac{2 \times O2}{T'},$$

wherein O1 is the first sensing value, O2 is the second sensing value, and T' is the time length.

7. The high-sensitivity light sensor according to claim 1, wherein the first reset circuit comprises:

a current source; and a reset switch, coupled between the current source and the first integrator, turned on while the first comparison signal is at the first level;

wherein while the reset switch is turned on, the current source provides a reset current to reset the first integration signal.

8. The high-sensitivity light sensor according to claim 1, wherein the second reset circuit comprises:

a current source; and a reset switch, coupled between the current source and the second integrator, turned on while the second comparison signal is at the second level;

wherein while the reset switch is turned on, the current source provides a reset current to reset the second integration signal.

9. The high-sensitivity light sensor according to claim 1, wherein the first reset circuit comprises:

a voltage source; and a switch-capacitor circuit, coupled between the voltage source and the first integrator, configured to provide a reset current to reset the first integration signal while the first comparison signal is at the first level.

10. The high-sensitivity light sensor according to claim 1, wherein the second reset circuit comprises:

a voltage source; and a switch-capacitor circuit, coupled between the voltage source and the second integrator, configured to provide a reset current to reset the second integration signal while the second comparison signal is at the second level.

11. A high-sensitivity light sensor, comprising:

a light sensing element, configured to sense a light during a measurement time interval to generate a first current;

a first integrator, coupled to the light sensing element, configured to integrate the first current to generate a first integration signal;

a first comparator, coupled to the first integrator, configured to compare the first integration signal with a threshold value to generate a first comparison signal, wherein while the first integration signal is larger than the threshold value, the first comparison signal is at a first level;

a timer, coupled to the first comparator, wherein while the measurement time interval starts, the timer measures a first time length between adjacent first levels of the first comparison signal, and measures a second time length between a last first level of the comparison signal and an end of the measurement time interval;

a first reset circuit, coupled to the first integrator and the first comparator, configured to reset the first integration signal while the first comparison signal is at the first level;

a second integrator, coupled to the first integrator, configured to integrate the first integration signal to generate a second integration signal;

a second comparator, coupled to the second integrator, configured to compare the second integration signal with the threshold value to generate a second comparison signal, wherein while the second integration signal is larger than the threshold value, the second comparison signal is at a second level;

a second reset circuit, coupled to the second integrator and the second comparator, configured to reset the second integration signal while the second comparison signal is at the second level; and a counter, coupled to the second comparator, configured to count a number that the second comparison signal is at the second level to generate a sensing value;

wherein while the first comparison signal is at the first level, the light sensor stores the sensing value and resets the counter;

wherein while the measurement time interval ends, all stored sensing values and a present sensing value are used to determine an intensity of the light.

12. The high-sensitivity light sensor according to claim 11, wherein the first integrator comprises:
    an operational amplifier, having an inverting input terminal, a non-inverting input terminal, and an output terminal, wherein the inverting input terminal is coupled to the light sensing element, the non-inverting input terminal is coupled to a ground terminal, and the output terminal is coupled to the first comparator;
    a capacitor, coupled between the inverting input terminal and the output terminal; and
    a switch, connected in parallel with the capacitor;
    wherein while the measurement time interval starts, the switch is turned off; while the measurement time interval ends, the switch is turned on.

13. The high-sensitivity light sensor according to claim 11, wherein the second integrator comprises:
    an operational amplifier, having an inverting input terminal, a non-inverting input terminal, and an output terminal, wherein the non-inverting input terminal is coupled to a ground terminal and the output terminal is coupled to the second comparator;
    an impedance circuit, coupled between the inverting input terminal and the first integrator, configured to converting the first integration signal into a current signal;
    a capacitor, coupled between the inverting input terminal and the output terminal; and
    a switch, connected in parallel with the capacitor, turned on while the first comparison signal is at the first level.

14. The high-sensitivity light sensor according to claim 13, wherein the impedance circuit is a switch-capacitor circuit.

15. The high-sensitivity light sensor according to claim 11, wherein the intensity of the light is $$\frac{2 \times O2'}{T'} + \sum_{i=1}^{n} \frac{2 \times O2i}{Ti},$$

wherein T' is the second time length, O2' is the sensing value obtained in the second time length T', n is an integer, Ti is the first time length between the (i−1)th first level and the ith first level, O2$i$ is the sensing value obtained in the ith first time length Ti, and i is an integer larger than 1.

16. The high-sensitivity light sensor according to claim 11, wherein the first reset circuit comprises:
    a current source; and
    a reset switch, coupled between the current source and the first integrator, turned on while the first comparison signal is at the first level;
    wherein while the reset switch is turned on, the current source provides a reset current to reset the first integration signal.

17. The high-sensitivity light sensor according to claim 11, wherein the second reset circuit comprises:
    a current source; and
    a reset switch, coupled between the current source and the second integrator, turned on while the second comparison signal is at the second level;
    wherein while the reset switch is turned on, the current source provides a reset current to reset the second integration signal.

18. The high-sensitivity light sensor according to claim 11, wherein the first reset circuit comprises:
    a voltage source; and
    a switch-capacitor circuit, coupled between the voltage source and the first integrator, configured to provide a reset current to reset the first integration signal while the first comparison signal is at the first level.

19. The high-sensitivity light sensor according to claim 11, wherein the second reset circuit comprises:
    a voltage source; and
    a switch-capacitor circuit, coupled between the voltage source and the second integrator, configured to provide a reset current to reset the second integration signal while the second comparison signal is at the second level.

20. A sensing method of a high-sensitivity light sensor, comprising the steps of:
    using a light sensing element to sense a light during a measurement time interval to generate a first current;
    integrating the first current to generate a first integration signal;
    converting the first integration signal into a first sensing value;
    integrating the first integration signal to generate a second integration signal;
    generating a second sensing value according to the second integration signal; and
    determining an intensity of the light according to the first sensing value and the second sensing value.

21. A sensing method of a high-sensitivity light sensor, comprising the steps of:
    using a light sensing element to sense a light during a measurement time interval to generate a first current;
    integrating the first current to generate a first integration signal;
    integrating the first integration signal to generate a second integration signal;
    generating a sensing value according to the second integration signal; and
    determining an intensity of the light according to the sensing value.

* * * * *